(12) United States Patent
Kenyon et al.

(10) Patent No.: US 9,152,888 B2
(45) Date of Patent: Oct. 6, 2015

(54) SYSTEM AND METHOD FOR AUTOMATED OBJECT DETECTION IN AN IMAGE

(71) Applicant: Los Alamos National Security, LLC, Los Alamos, NM (US)

(72) Inventors: Garrett T. Kenyon, Santa Fe, NM (US); Steven P. Brumby, Santa Fe, NM (US); John S. George, White Rock, NM (US); Dylan M. Paiton, Rio Rancho, NM (US); Peter F. Schultz, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 67 days.

(21) Appl. No.: 14/026,730

(22) Filed: Sep. 13, 2013

(65) Prior Publication Data

US 2014/0072208 A1    Mar. 13, 2014

Related U.S. Application Data

(60) Provisional application No. 61/700,698, filed on Sep. 13, 2012.

(51) Int. Cl.
*G06K 9/62* (2006.01)
*G06K 9/80* (2006.01)
*G06K 9/46* (2006.01)

(52) U.S. Cl.
CPC ............... *G06K 9/80* (2013.01); *G06K 9/4604* (2013.01); *G06K 9/468* (2013.01); *G06K 9/4609* (2013.01); *G06K 9/6211* (2013.01); *G06K 9/6212* (2013.01)

(58) Field of Classification Search
CPC . G06K 9/6211; G06K 9/6256; G06K 9/4604; G06T 7/0085; G06T 7/0083; G06T 7/0087
See application file for complete search history.

(56) References Cited

U.S. PATENT DOCUMENTS

| | | | |
|---|---|---|---|
| 6,100,899 A | 8/2000 | Ameline et al. | |
| 7,058,128 B1 | 6/2006 | Itokawa | |
| 7,542,959 B2 * | 6/2009 | Barnhill et al. | 706/48 |
| 7,734,097 B1 * | 6/2010 | Porikli et al. | 382/190 |
| 8,768,048 B1 * | 7/2014 | Kwatra et al. | 382/159 |
| 2004/0161133 A1 * | 8/2004 | Elazar et al. | 382/115 |
| 2004/0252882 A1 * | 12/2004 | Krumm et al. | 382/159 |
| 2007/0098222 A1 * | 5/2007 | Porter et al. | 382/103 |
| 2008/0170623 A1 | 7/2008 | Aharon et al. | |
| 2010/0040296 A1 | 2/2010 | Ma et al. | |
| 2010/0128942 A1 | 5/2010 | Licato et al. | |

(Continued)

OTHER PUBLICATIONS

W.S. Geisler, J.S. Perry "Contour statistics in natural images: grouping across occlusions" Vis. Neurosci., 26 (1) (2009), pp. 109-121.*

(Continued)

*Primary Examiner* — Nirav G Patel
*Assistant Examiner* — Ian Lemieux
(74) *Attorney, Agent, or Firm* — LeonardPatel PC

(57) ABSTRACT

A contour/shape detection model may use relatively simple and efficient kernels to detect target edges in an object within an image or video. A co-occurrence probability may be calculated for two or more edge features in an image or video using an object definition. Edge features may be differentiated between in response to measured contextual support, and prominent edge features may be extracted based on the measured contextual support. The object may then be identified based on the extracted prominent edge features.

20 Claims, 13 Drawing Sheets

(56) References Cited

U.S. PATENT DOCUMENTS

| | | | |
|---|---|---|---|
| 2011/0064302 A1 | 3/2011 | Ma et al. | |
| 2011/0075920 A1* | 3/2011 | Wu et al. | 382/160 |
| 2011/0075938 A1 | 3/2011 | Singhal | |
| 2011/0188757 A1 | 8/2011 | Chan et al. | |
| 2011/0243434 A1* | 10/2011 | Cao | 382/165 |
| 2012/0269436 A1* | 10/2012 | Mensink et al. | 382/180 |

OTHER PUBLICATIONS

A.M. Waxman, J.G. Verly, D.A. Fay, F. Liu, M.I. Braun, B. Pugliese, W. Ross, and W. Streilein, "A prototype system for 3D color fusion and mining of multisensor/spectral imagery", 4th International Conference on Information Fusion, Montreal, 2001.

Brophy, A. L. "Alternatives to a table of criterion values in signal detection theory". Behavior Research Methods, Instruments, & Computers, 18, 285-286 (1986).

C. Cortes & V. Vapnik, "Support-Vector Networks", Machine Learning, 20, 273-297 (1995).

Carpenter, G. A., Gjaja, M. N., Gopal, S., & Woodcock, C. E. "ART neural networks for remote sensing: vegetation classification from Landsat TM and terrain data". IEEE Transactions on Geoscience and Remote Sensing, 35, 308-325 (1997).

Chang, C.C. and C.J. Lin. "LIBSVM—A Library for Support Vector Machines," (2001). Available: http://www.csie.ntu.edu.tw/~cjlin/libsvm.

D. G. Lowe, "Object recognition from local scale-invariant features," Proceedings of the International Conference on Computer Vision, 1999.

D. L. Donoho and M. Elad, "Optimally sparse representation in general (nonorthogonal) dictionaries via L1 minimization", Proc. National Academy of Sciences, 100, pp. 2197-2202 (2003).

Daniela I. Moody, Steven P. Brumby, Kary L. Myers, Norma H. Pawley, "Classification of transient signals using sparse representations over adaptive dictionaries", Proceeding of SPIE vol. 8058, Orlando, FL, Apr. 25-29 2011.

Hebb, D.O., "The organization of behavior", New York: Wiley, 1949.

Hubel, D.H., Wiesel, T.N. "Receptive fields and functional architecture of monkey striate cortex". J. Physiol. (Lond.) 195, 215-243 (1968).

J. Mairal, F. Bach, and J. Ponce, "Task-driven dictionary learning," preprint, 2010. Printed in IEEE Transactions on Pattern Analysis and Machine Intelligence, vol. 34, No. 4, Apr. 2012.

J. Mairal, M. Elad and G. Sapiro. "Sparse representation for color image restoration". IEEE Transactions on Image Processing. vol. 17, issue 1, pp. 53-69 (Jan. 2008).

K. Fukushima, "Neocognitron: A self-organizing neural network model for a mechanism of pattern recognition unaffected by shift in position", Biological Cybernetics, 36(4), pp. 193-202 (Apr. 1980).

L. Itti, C. Koch, E. Niebur, "A Model of Saliency-Based Visual Attention for Rapid Scene Analysis", IEEE Transactions on Pattern Analysis and Machine Intelligence, vol. 20, No. 11, pp. 1254-1259 (Nov. 1998).

M. Chiarella, D. Fay, R. Ivey, N. Bomberger, A. Waxman, "Multisensor image fusion, mining, and reasoning: Rule sets for higher-level AFE in a COTS environment", Proceedings of the 7th International Conference on Information Fusion, Stockholm, Sweden, pp. 983-990 (Jun. 2004).

Masquelier T, Serre T, Thorpe SJ and Poggio T., "Learning complex cell invariance from natural videos: a plausibility proof." CBCL Paper #269/MIT-CSAIL-TR #2007-060, MIT, Cambridge, MA, 2007.

Oja, Erkki, "A simplified neuron model as a principal component analyzer", Journal of Mathematical Biology 15 (3): 267-273 (Nov. 1982).

Olshausen, B. A. and Field, D. J., "Emergence of simple-cell receptive field properties by learning a sparse code for natural images". Nature, 381:607-609 (1996).

Paul Henning and Andrew White, "Trailblazing with Roadrunner", Computing in Science & Engineering, pp. 91-95 (Jul./Aug. 2009).

R. DeValois, D. Albrecht, and L. Thorell, "Spatial Frequency Selectivity of Cells in Macaque Visual Cortex", Vision Research, vol. 22, pp. 545-559 (1982).

R. DeValois, E. Yund, and N. Hepler, "The Orientation and Direction Selectivity of Cells in Macaque Visual Cortex", Vision Research, vol. 22, pp. 531-544 (1982).

Riesenhuber, M. & Poggio, T. "Hierarchical Models of Object Recognition in Cortex", Nature Neuroscience 2:1019-1025 (1999).

S. G. Mallat and Z. Zhang, "Matching Pursuits with Time-Frequency Dictionaries", IEEE Transactions on Signal Processing, pp. 3397-3415 (Dec. 1993).

Steven Brumby, Luis Bettencourt, Michael Ham, Ryan Bennett, and Garrett Kenyon, "Quantifying the difficulty of object recognition tasks via scaling of accuracy versus training set size", Computational and Systems Neuroscience (COSYNE) 2010, Salt Lake City, Utah, Feb. 25-28, 2010.

Steven Brumby, Michael Ham, Will A. Landecker, Garrett Kenyon, Luis Bettencourt, "Visualizing classification of natural video sequences using sparse, hierarchical models of cortex", Computational and Systems Neuroscience (COSYNE) 2011, Salt Lake City, Utah, Feb. 24-27, 2011. [Nature Precedings, npre.2011.5971.1].

Steven P. Brumby, Amy E. Galbraith, Michael Ham, Garrett Kenyon, and John S. George, "Visual Cortex on a Chip: Large-scale, real-time functional models of mammalian visual cortex on a GPGPU", GPU Technology Conference (GTC) 2010, San Jose, CA, Sep. 20-23, 2010.

Steven P. Brumby, Garrett Kenyon, Will Landecker, Craig Rasmussen, Sriram Swaminarayan, and Luis M. A. Bettencourt, "Large-scale functional models of visual cortex for remote sensing", 38th IEEE Applied Imagery Pattern Recognition, Vision: Humans, Animals, and Machines, Cosmos Club, Washington DC Oct. 14-16, 2009.

T. Serre, A. Oliva and T. Poggio. "A feedforward architecture accounts for rapid categorization". Proceedings of the National Academy of Science, 104(15), pp. 6424-6429 (Apr. 2007).

T. Serre, L. Wolf, S. Bileschi, M. Riesenhuber and T. Poggio. "Object recognition with cortex-like mechanisms". IEEE Transactions on Pattern Analysis and Machine Intelligence, 29(3), pp. 411-426 (2007).

USGS Hyperion Sensors Site, http://eo1.usgs.govisensors/hyperion, last modified Dec. 13, 2011 (last accessed Jan. 24, 2014).

First set of IEEE Xplore search results provided by Examiner in U.S. Appl. No. 14/026,812 from http://ieeexplore.ieee.org/search/searchresult.jsp on Jan. 12, 2015 (complete query string not visible).

Ian L. Lemieux, "Non-Final Office Action" issued on Mar. 30, 2015 for U.S. Appl. No. 14/026,295.

Non-final Office Action issued in U.S. Appl. No. 14/026,812, Jan. 12, 2015.

Second set of IEEE Xplore search results provided by Examiner in U.S. Appl. No. 14/026,812 from http://ieeexplore.ieee.org/search/searchresult.jsp on Jan. 12, 2015 (complete query string not visible).

Notice of Allowance issued in U.S. Appl. No. 14/026,812, May 29, 2015.

\* cited by examiner

200

210

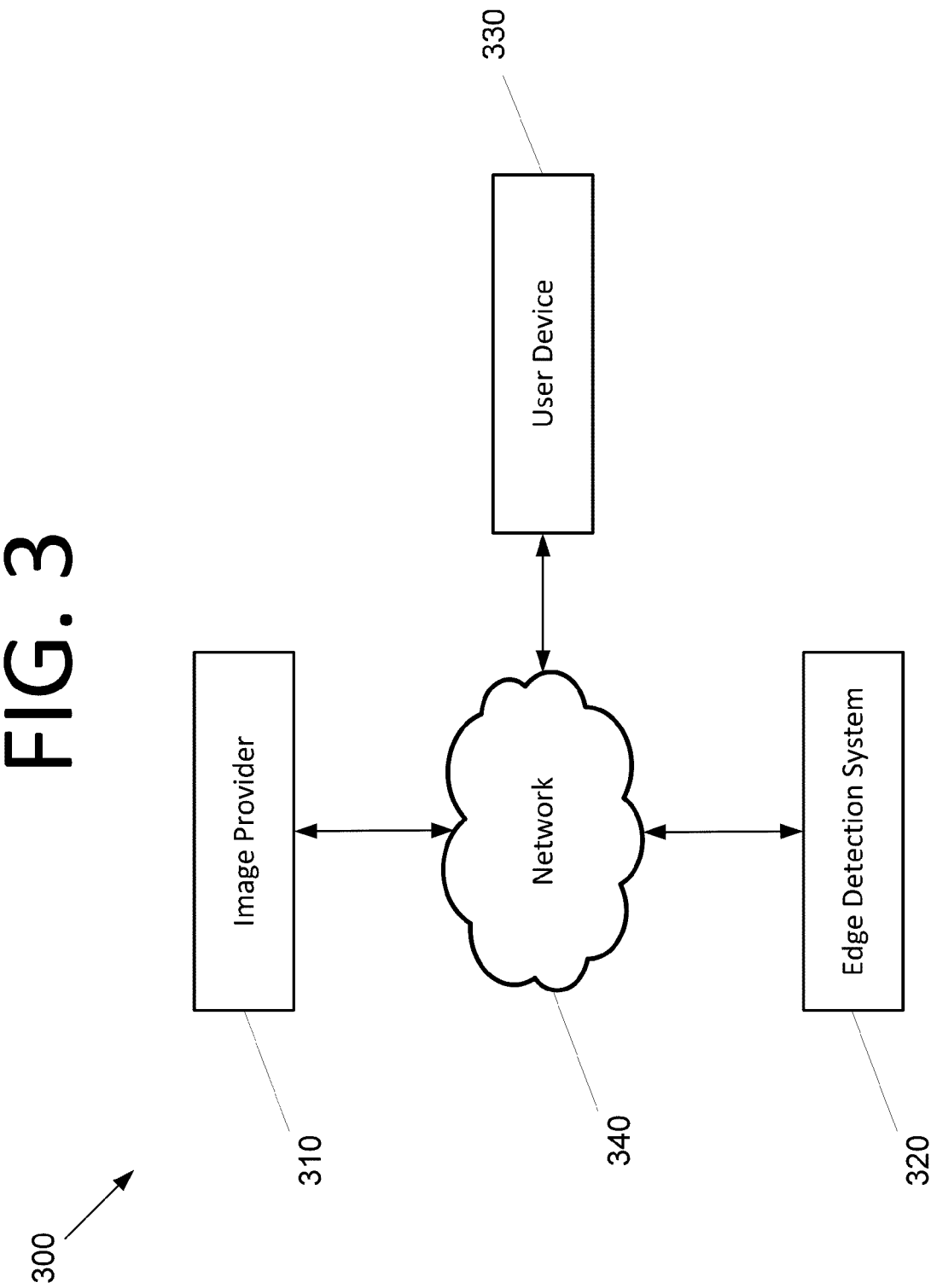

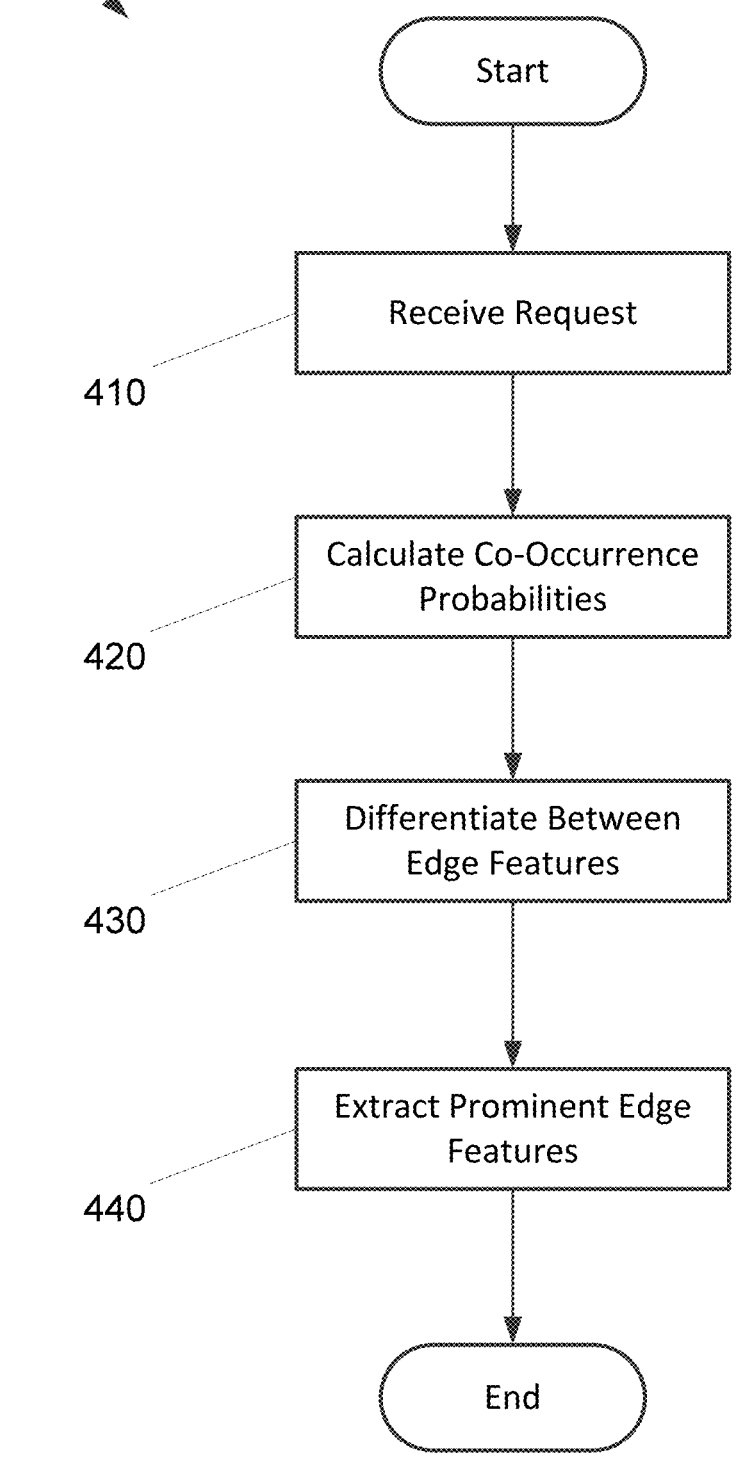

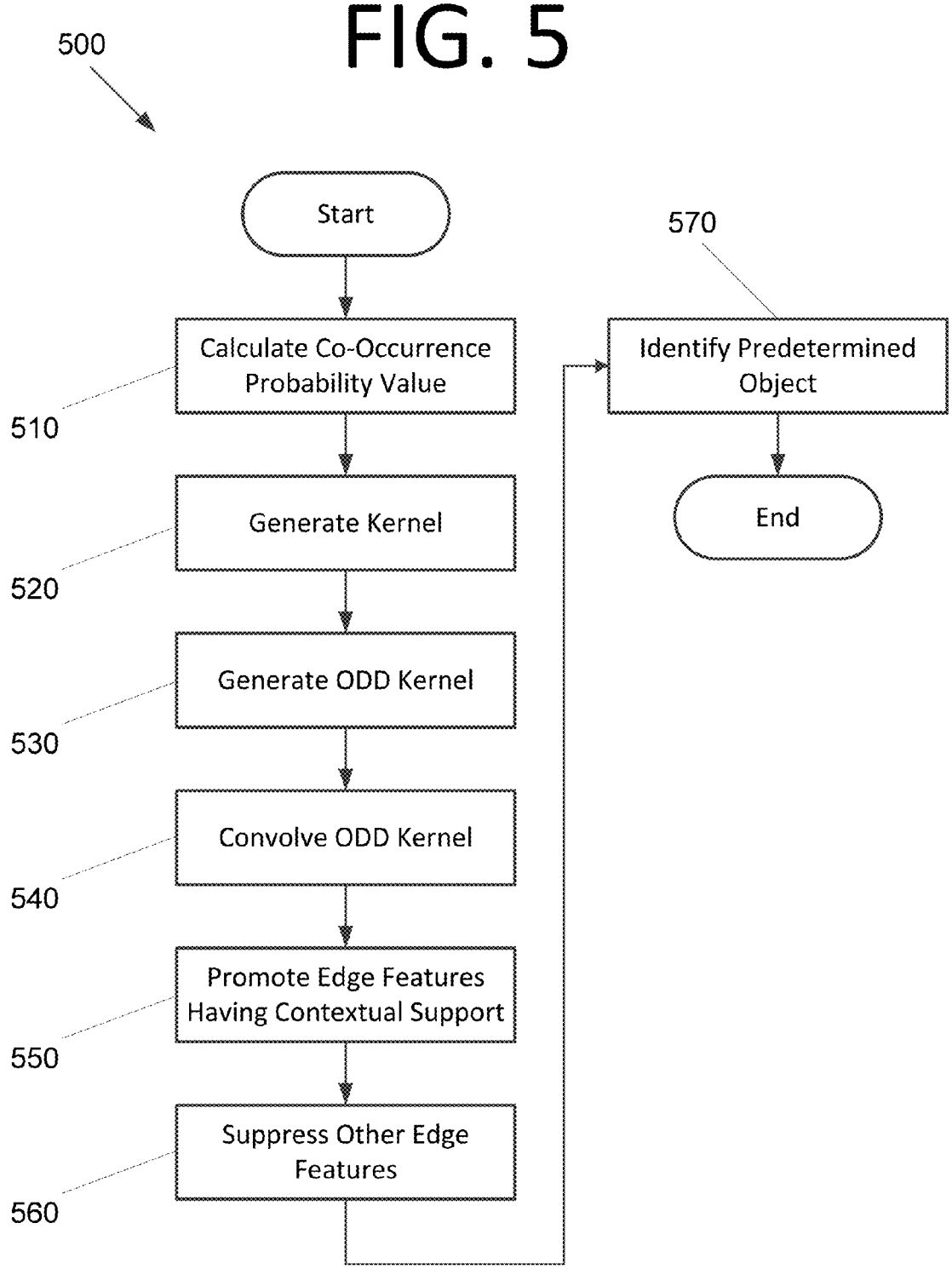

SYSTEM AND METHOD FOR AUTOMATED OBJECT DETECTION IN AN IMAGE

CROSS REFERENCE TO RELATED APPLICATIONS

This application claims the benefit of U.S. Provisional Application Ser. No. 61/700,698, filed on Sep. 13, 2012. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to edge detection, and, more particularly, to detecting edges pertaining to a desired object in an image or video by applying models that use contour and shape.

BACKGROUND

Recent developments in machine vision have demonstrated remarkable improvements in the ability of computers to properly identify particular objects in a viewing field. Most of these advances rely on color-texture analyses that require targets objects to possess one or more highly distinctive, local features that can be used as distinguishing characteristics for a classification algorithm. Many objects, however, consist of materials that are widely prevalent across a wide variety of object categories. For example, many mammals are covered with hair or fur, making a detector configured/trained to identify the presence of hair/fur a potentially good discriminator between mammals and non-mammals, but not a particularly good discriminator between different mammalian species. Similarly, many trees have leaves, many man-made objects are made of painted metal, and so forth, such that color-texture detectors configured/trained to identify leaves or painted metal are good for some categorizations, but not for others. Much less effort has been made to characterize objects based on shape, or the particular way the component features are arranged relative to one another in two dimensional (2D) image space.

The overarching goal of creating a machine that can see as well as a human has influenced prior researchers to focus on amplification of computing power to match that of the human visual system, i.e., requiring petaflops of computing power. Although historically such computing power has not been available to the vast majority of computer users, the advent of cloud computing and the introduction of graphical processing units, multi-core processors, smart caches, solid-state drives, and other hardware acceleration technologies suggests that access to sufficient computing power per se should not be the major impediment to effective machine-based object recognition going forward. More importantly, the goal remains to develop object-recognition systems that are sufficiently accurate to support commercial applications. Specifically, an algorithm capable of highly accurate object identification in an image, on the level of the typical performance of a Google® search based on a key word, is likely to receive widespread consumer acceptance. Accordingly, a system and method for highly accurate, automated object detection in an image or video frame may be beneficial.

SUMMARY

Certain embodiments of the present invention may provide solutions to the problems and needs in the art that have not yet been fully identified, appreciated, or solved by current edge detection technologies. For example, some embodiments of the present invention implement a contour/shape detection model based on relatively simple and efficient kernels for detecting target edges (i.e., edges that are part of target objects) within an image or video. A differential kernel can be employed to select edge segments that are included in desired objects based upon probabilistic relationships between both pairs and n-tuples of edge segments as a function of their relative spacing and relative orientation. Such a method may function to suppress background edges while promoting target edges, leaving only those contours/shapes that are more likely to be included in the desired object.

In one embodiment, a computer-implemented method includes calculating, by a computing system, a co-occurrence probability for two or more edge features in an image or video using an object definition. The computer-implemented method also includes differentiating between edge features, by the computing system, in response to a measured contextual support and extracting, by the computing system, prominent edge features based on the measured contextual support. The computer-implemented method further includes identifying the object, by the computing system, based on the extracted prominent edge features.

In another embodiment, a computer program is embodied on a non-transitory computer-readable medium. The computer program is configured to cause at least one processor to generate a training corpus that is divided into target and distractor images or videos. The computer program is also configured to cause the at least one processor to calculate estimates of n-wise co-occurrence probabilities of oriented edges conditioned on presence or absence of globally salient contours. The computer program is further configured to cause the at least one processor to generate a kernel in response to each calculated n-wise co-occurrence probability value.

In yet another embodiment, a system includes an image provider configured to distribute, provide, present, capture, record, process, and/or transmit one or more images and/or videos for object identification. The system also includes an edge detection system configured to capture, identify, detect, and/or extract a portion of an image or video from a larger image or video provided by the image provider based on contour and shape.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 illustrates a system for detecting edges in an image or video, according to an embodiment of the present invention.

FIG. 4 is a flowchart illustrating a method for detecting edges in an image or video, according to an embodiment of the present invention.

FIG. 5 is a flowchart illustrating a method for identifying an object in an image or video, according to an embodiment of the present invention.

DETAILED DESCRIPTION OF THE EMBODIMENTS

Some embodiments of the present invention use a contour/shape detection model based on efficient kernels to detect target edges in an object. Conventionally, only color/texture analysis is used. As such, embodiments configured for contour/shape detection may be used alone or in concert with color/texture analysis to facilitate more effective edge detection.

In some embodiments, edge segments may be selected that are included in desired objects based upon probabilistic relationships between pairs and n-tuples of edge segments as a function of their relative spacing and relative orientation. Embodiments that utilize only pairwise edge co-occurrence statistics may require less processing and memory storage than embodiments that utilize higher order correlations between edge features, but do not achieve as high a degree of accuracy on prototype target detection tasks. Embodiments that utilize the co-occurrence statistics of triples of edge features, for example, achieve qualitatively better performance than embodiments that utilize only pairwise co-occurrence probabilities (see FIG. 1). However, embodiments that utilize triples of edge features require exponentially more memory storage because there are exponentially more ways that triples of edge features can be combined as compared to pairwise combinations. Similarly, embodiments that utilize triples of edge features require exponential increases in computation as compared to the computation requirements of embodiments that utilize only pairwise co-occurrence statistics. In principle, embodiments of $n^{th}$ order object-distractor difference (ODD) kernels can utilize the co-occurrence statistics of n-tuples of edge features for any finite integer value of n, with performance on target detection tasks expected to increase monotonically with increases in n. However, memory and computational requirements would be expected to increase exponentially with n as well. It is expected that different applications may employ embodiments of $n^{th}$ order ODD kernels corresponding to different values of n, depending on the accuracy required and the computational and memory resources available for particular applications.

Figure 1:
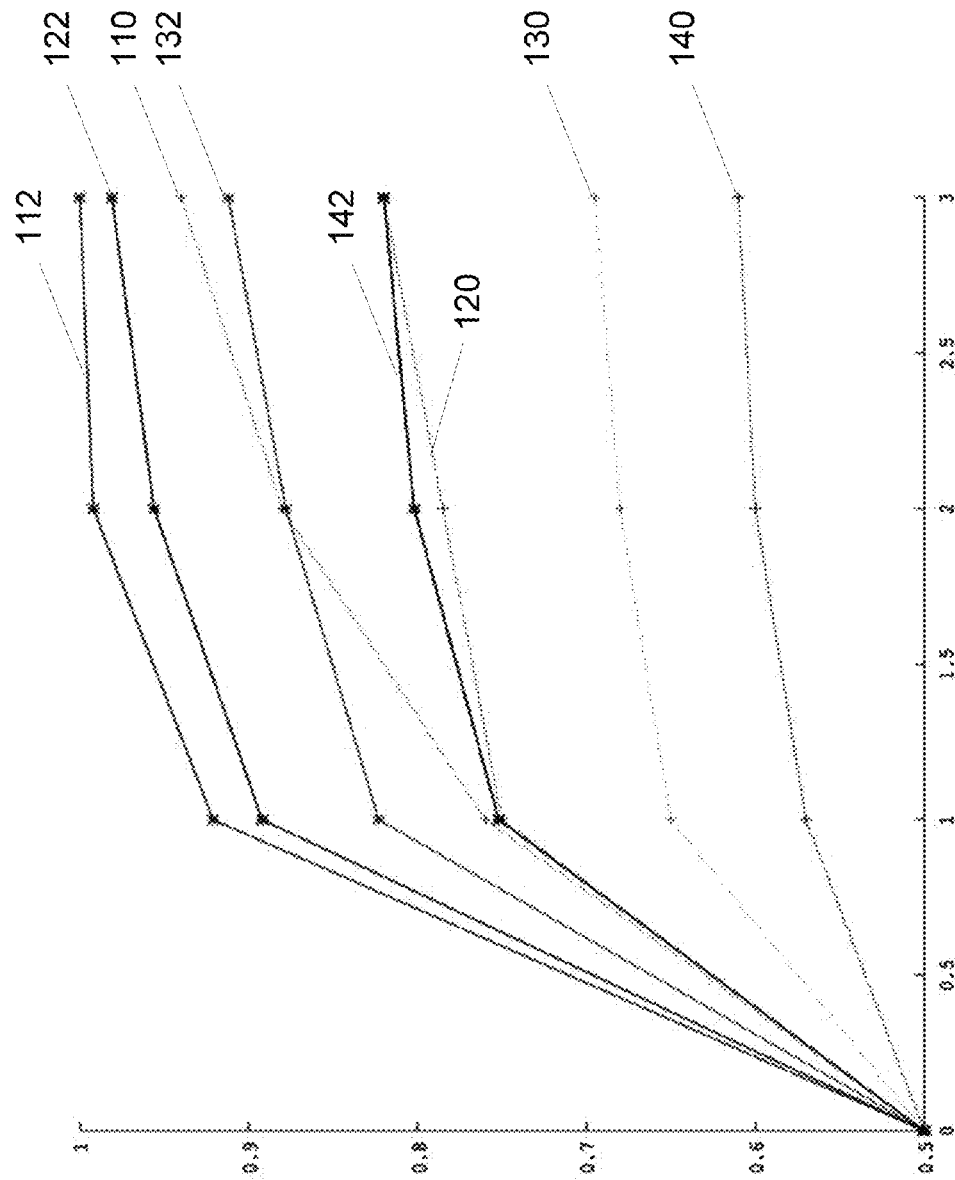
FIG. 1 is a graph illustrating comparison of target detection performance of $2^{nd}$ order versus $3^{rd}$ order ODD kernels based on the co-occurrence statistics of pairwise versus triples of edge features, respectively, on an amoeba/no amoeba task, according to an embodiment of the present invention.

FIG. 1 is a graph 100 illustrating comparison of target detection performance of $2^{nd}$ order versus $3^{rd}$ order ODD kernels based on the co-occurrence statistics of pairwise versus triples of edge features, respectively, on an amoeba/no amoeba task, according to an embodiment of the present invention. Target detection performance was assessed as the percentage of amoeba/no amoeba images correctly classified based on the total number of preserved edges after successive iterations of the corresponding ODD kernel, with the number of iterations indicated on the x-axis (abscissa). Dotted lines correspond to the performance mediated by $2^{nd}$ order ODD kernels. Solid lines correspond to the performance mediated by $3^{rd}$ order ODD kernels. K values of 2, 4, 6, and 8 for $2^{nd}$ order ODD kernels are shown by 110, 120, 130, and 140, respectively. K values of 2, 4, 6, and 8 for $3^{rd}$ order ODD kernels are shown by 112, 122, 132, and 142, respectively.

Figure 2A:
FIG. 2A is an image frame illustrating target detection of cars using a $2^{nd}$ order ODD kernel, according to an embodiment of the present invention.
Figure 2B:
FIG. 2B is an image frame illustrating target detection of cars using a $3^{rd}$ order ODD kernel, according to an embodiment of the present invention.

The use of $3^{rd}$ order ODD kernels, which are based on the computed co-occurrence statistics of triples of features, yielded substantially superior target detection performance compared to the use of $2^{nd}$ order ODD kernels. For instance, use of $3^{rd}$ order ODD kernels tends to yield fewer false positives than using $2^{nd}$ order ODD kernels. Detection of cars for a $2^{nd}$ order ODD kernel and a $3^{rd}$ order ODD kernel is shown in image frames 200 and 210 of FIGS. 2A and 2B, respectively. The reduction in false positives is perhaps most clearly seen in that the $3^{rd}$ order ODD kernel yields fewer false positives in the lower right region of FIG. 2B than the same region of FIG. 2A where the $2^{nd}$ order kernel was applied.

However, $3^{rd}$ order ODD kernels required substantially more memory and computational resources. It may also be inferred that using still higher order kernels may yield even superior performance, but even more memory and computational resources would be required. Some of the observed improvement in performance resulted from higher precision storage of the separate target and distractor kernels prior to differencing, but the main effect was due to the utilization of higher order co-occurrence statistics.

It is also expected that some embodiments could include combinations of $n^{th}$ order ODD kernels utilizing co-occurrence statistics spanning a range of n-tuples of edge features, with n ranging from 2 to some maximum value greater than 2. It is expected that the target-detection procedures described herein could be naturally generalized to embodiments consisting of combinations of $n^{th}$ order ODD kernels such that the performance for the combined system would be superior to the performance of an individual embodiment utilizing a specific value of n. This expectation is based on the mathematical observation that $n^{th}$ order co-occurrence statistics are generally not expressible as combinations of co-occurrence statistics of lower order. Thus, it should be mathematically guaranteed that an embodiment that utilizes a combination of ODD kernels based on co-occurrence statistics spanning multiple orders, including pairwise, triples, quartets, and higher-order combinations of edge features up to and including n, would perform at least as well as, and in most cases better than, an embodiment utilizing $n^{th}$ order ODD kernels alone.

Such a system may be configured to detect shapes. In other words, the system may be configured to look for features that are part of shapes that tend to be characteristic of certain objects. Typically, the system is initially "trained" to detect edges of characteristic shapes as annotated by bounding boxes drawn by a human, such as cars, trees, or any other desired object. Training data may include images or video frames where a human being draws a bounding box (e.g., a rectangle or quadrilateral around target objects). The "trained" algorithm of some embodiments tends to highlight or preserve edges that are part of components of the desired object, such as tires, windshields, etc. that are parts of cars. More specifically, the algorithm of some embodiments looks for edges in the local neighborhood that tend to co-occur with a particular edge when that particular edge is part of an object.

Embodiments seek to track the precise spatial relationships between edge features, typically corresponding to the contours of either the target object itself or of stereotypical components. The problem of detecting edge contours is analogous to solving a Completely Automated Public Turing test to tell Computers and Humans Apart (CAPTCHA) that attempts to prove that a user of a website, for example, is a human. Some embodiments reproduce edge linking processes in humans using a machine—for instance, identifying edges that are part of a letter as opposed to a distraction. Spatial relationships are generally important to this process.

FIG. 3 illustrates a system 300 for detecting edges in an image or video, according to an embodiment of the present invention. System 300 includes an image provider 310, an edge detection system 320, and a user device 330, all of which are interconnected and/or interconnectable through network 340. In some embodiments, edge detection system 320 may be system 1200 of FIG. 12.

System 300 may capture, identify, detect, and/or extract a portion of an image or video from a larger image or video, and the portion of the image or video may represent a desired object. By way of example, system 300 may be used in any number of machine vision or artificial intelligence applications including, but not limited to, surveillance, satellite imaging, traffic management, video-based database searching (e.g., web searching using video matching rather than text/hypertext matching), business intelligence, video content delivery, video content searching, data storage, data compression (e.g., storage only of the image portions relating to the desired object), data mining, gaming, user interface/experience, medical imaging/diagnostics, and/or any other suitable machine-human or machine-video interaction.

As shown in FIG. 3, system 300 includes an image provider 310 configured to distribute, provide, present, capture, record, process, and/or transmit one or more images for object identification. Suitable images may include still images or video frames, either of which can be in any suitable form or format and may represent any suitable spectrum (e.g., visible, infrared, etc.). The images can be live, substantially live (e.g., with a slight delay), or stored. Suitable images may also be presented in raw, filtered, compressed, and/or streaming format, or in any other suitable format. Some non-limiting examples of devices that may be used as image provider 310 include any local/remote memory module for a camera, such as a satellite camera, a terrestrial surveillance camera, or any accessible private party camera. Image provider 310 may include a server that stores, retrieves, and/or permits access to its files through the Internet, such as, for example, a video-sharing server. Image provider 310 may also include a digital or analog television, video-on-demand, or other media services that are widely distributed to consumers through one or more devices and/or through one or more channels (e.g., via cable service, Internet service, cellular data service, etc.).

As shown in FIG. 3, system 300 also includes an edge detection system 320 configured to communicate with image provider 310 via network 340. Alternatively, edge detection system 320 and image provider 310 may be integrated into a single device (not shown). Edge detection system 320 may capture, identify, detect, and/or extract a portion of an image from a larger image provided by image provider 310. Edge detection system 320 may be configured to receive instructions from user device 330 that indicate which or what type of object the processor should locate within the image(s). Furthermore, edge detection system 320 may be configured to return an indication, selection, and/or identification of the object within the image(s) or video(s) to user device 330, possibly at the user's request. The indication, selection, and/or identification may include, for example, a real time or near-real time identification of the object(s) in one or more images or a stream of video/images.

As shown in FIG. 3, user device 330 is capable of communicating with edge detection system 320 and/or image provider 310 via network 340. Alternatively, user device 330, edge detection system 320, and image provider 310 may be integrated (in whole or in part) into a standalone device (not shown). User device 330 may receive and transmit user input relating to an object identification and/or classification. User device 330 may also receive, from edge detection system 320, a determination of the object identification in the image(s) and present the object identification to the user, for instance, by changing the color of the object, drawing an outline around the object, or via any other suitable means.

User device 330 can be any suitable computing device including, but not limited to, a mainframe computer, a server, a server cluster, a virtual machine running on a cloud-computing platform, a desktop computer, a laptop computer, a platform computer, a smart phone, a personal digital assistant, or any suitable combination, network, or subnetwork thereof. Network 340 may include a commercially available Internet connection, although other variations may be utilized in system 300. Example networks 340 may include wireless cellular/data networks, intranets, secured computing networks, satellite communications networks, WiFi/WiMax networks, any suitable combination thereof, or any other suitable network.

FIG. 4 is a flowchart 400 illustrating a method for detecting edges in an image or video, according to an embodiment of the present invention. The method may function to capture, identify, detect, and/or extract a portion of an image or video from a larger image or video, the portion of the image or video representing a desired object. As an example, the method may extract images of cars from within a widescreen high definition (HD) video of a Los Angeles freeway based at least in part upon the edge features of the cars and their respective contexts within the video feed. The method may be used in any number of machine vision or artificial intelligence applications including, but not limited to, surveillance, satellite imaging, traffic management, video-based database searching (e.g., web searching using video matching rather than text/hypertext matching), business intelligence, video content delivery, video content searching, data storage, data compression (e.g., storage only of the image portions relating to the desired object), data mining, gaming, user interface/experience, medical imaging/diagnostics, and/or any other suitable machine-human or machine-video interaction.

The method begins with receiving a request to identify an object in an image at 410. The request may include inputting, capturing, determining, calculating, and/or receiving an input from a user, where the input is indicative of an object that is, can be represented as, and/or is contained within a still or video image. A person of ordinary skill in the art will immediately recognize that, as used herein, an object can refer to either or both of a real object or a representation of that object in an image. Such an object representation can be embodied in digital data formatted into a plurality of pixels, and the digital data can be raw, compressed, formatted, or presentable in any other suitable mode or manner. Accordingly, the identification of an object in an image can include identifying, within the image, the plurality of pixels that correspond to the representation of the object within the context of the image, which, in turn, can be registered to real, synthetic, and/or augmented space(s). User input may be received through a suitable user interface, such as a mouse, keypad, trackpad, touchscreen, voice command, gesture, or any suitable combination thereof. The request may include classes, sets, subsets, or groupings of objects, such as, for example, white cars, red shoes, men/women, and the like, assuming the imposition of suitable chromatic filters, where appropriate.

Next, in response to an object definition, a co-occurrence probability is calculated for one or more (pairs, n-tuples, or a combination of pairwise and higher order groupings) edge features at 420. The calculation may include computing, determining, generating, and/or calculating an n-wise co-occurrence probability of oriented edges conditioned on the presence or absence of globally salient contours. The object definition may include one or more images or representations of the object spanning the desired range of poses and points of view, from which edge features of the object can generally be determined in a viewpoint and pose-invariant manner. In some embodiments, the definition may be derived from a learned set of kernels that utilize a training set including tens to hundreds of thousands of images of the object. Alternatively, the object definition may be derived from a large training corpus including both target (i.e., object) images and distractor (i.e., background) images.

In some embodiments, the training corpus may be used, in part, to generate the co-occurrence probability by determining and/or calculating the probability of two edge features being part of a single object/distractor. As an example, two edges that are found to consistently form portions of the same object/distractor may generate a relatively higher co-occurrence probability of being part of the same object, i.e., relatively square edges are more likely to be a windshield of a car than part of a tree. The same principle can readily be extended to n-tuples of edge features as described herein.

Edge features are differentiated between in response to measured contextual support at 430. The differentiation may include separating, categorizing, distinguishing, and/or differentiating two or more edge features into two or more categories, e.g., of the object or not of the object. For each edge feature, it may be determined whether the given edge feature is more or less likely to be a part of the object based at least in part upon the contextual support surrounding that edge feature. That is, if the edge feature is probably a portion of a car, and the edge feature is surrounded by other edge features that are also probably a portion of the car, then the resulting processed image or video contains primarily only the collection of edge features that are part of the object, i.e., at least a portion of the object is identified.

In some embodiments, an ODD kernel is constructed that is convolved with every, or nearly every, edge feature in the image or video to obtain the lateral contextual support at each location and/or orientation across the entire image or video. In some embodiments, the ODD kernel can include a plurality of separate kernels having unique or quasi-unique orientations against which an edge element is measured. In certain embodiments, the ODD kernel may include a series of eight different kernels of differing rotational values. However, any other suitable number of kernels, rotational values, regularity/irregularity of the kernel intervals, etc. may be used as a matter of design choice.

Prominent edge features are extracted at 440 in order to identify the object. The extraction may include preserving, identifying, sequestering, promoting, and/or extracting those edge features that have substantial contextual support (i.e., at least a predetermined threshold value) through the ODD kernel while suppressing, eliminating, and/or demoting those edge features that do not have substantial contextual support (i.e., less than the predetermined threshold value). In practice, a threshold value of 0.5, relative to a minimum value of 0 and a maximum value of 1, was found to yield good results. Higher thresholds would suppress more edges, and thus reduce false positives, while lower thresholds would suppress fewer edges, and thus reduce false negatives. In principle, improved target detection performance can be achieve by using a lower threshold in combination with additional iterations of the ODD kernel filtering procedure, with the ODD kernels trained separately, and thus optimized, for each iteration. False positives (non-target edges) that were not suppressed in earlier iterations could then, in principle, be suppressed in subsequent iterations after much of the non-target clutter has been removed by the earlier iterations. Ultimately, the choice of threshold and the number of iteration steps applied to each image depends on the nature of the application and the memory and computational resources available.

In operation, edge features that have relatively substantial contextual support tend to be more likely to be a portion of the desired object, while edge features lacking substantial contextual support tend to be more likely to be part of the background clutter in the image or video. The lateral contextual support may be applied multiplicatively, minimizing the appearance of illusory edges. Any, some, or all of the method steps may be performed iteratively two or more times, and in a serial, parallel, or feedback loop fashion. In some embodiments, at least steps 430 and 440 are performed iteratively to mimic the exchange of information along horizontal connections in the primary visual cortex.

As noted above, the method may include n-wise, hierarchical ODD kernels that detect and segment one object category (e.g., cars) from everything else (e.g., non-cars). In some embodiments, the "one vs. all" procedure can be adapted in a technically feasible manner to achieve simultaneous detection and segmentation of thousands of object categories. This variation of method may include training a hierarchical network to detect and segment $N_0$ object categories, where $N_0$ may be assumed to be on the order of the number of object categories that can be readily distinguished by typical human subjects, e.g. many thousands. In operation, an initial set of $N_0$ ODD kernels may be trained for each of the $N_0$ initial categories. These $N_0$ initial ODD kernels may then be clustered by combining ODD kernels that meditate highly correlated responses so as to produce a much smaller set of $M_1$ ODD kernels, where $M_1 \ll N_0$. For example, the first set of ODD kernels may include an ODD kernel for "cat" and another ODD kernel for "dog." The responses mediated by these two first-level ODD kernels may be highly correlated since at the first processing level, the underlying shape features of dogs and cats are presumably indistinguishable.

Alternatively, at the first processing level, the responses mediated by ODD kernels trained on cats and dogs may not be strongly correlated with the responses mediated by ODD kernels trained on very different objects, such as "buildings," "trees," "mountains," etc. Thus, the reduced set of $M_1$ ODD kernels may represent the constellation of shape features that can be distinguished at the first processing stage. As before, the above procedure can be applied iteratively. The responses to the first reduced set of $M_1$ clustered ODD kernels may first be spatially down-sampled, or pooled. Then, a new set of $N_0$ ODD kernels may be learned, taking as input the responses from the first reduced set of $M_1$ clustered ODD kernels and computing co-occurrence statistics as described above. The second set of $N_0$ ODD kernels can then be clustered as before, producing a new set of $M_2$ ODD kernels, where $M_2 > M_1$, representing a more specialized set of shape features. The above procedure may then be repeated K times, until $M_K \sim = N_0$. At this point, the original $N_0$ object categories may be detected and segmented by a hierarchical network of $M_1 + M_2 + \ldots + M_K$ n-wise ODD kernels.

The single pairwise ODD kernel training method described above may be extremely rapid and can be performed in parallel with processing other kernels, yielding state-of-the-art performance on "one vs. all" detection and localization tasks. Preliminary data further suggests that 3-way ODD kernels substantially improve performance as compared to 2-way (pairwise) ODD kernels, and that n-wise ODD kernels can be combined with spatial pooling, or down-sampling, extending the effective radius of the ODD kernels without increasing computational load. The ODD kernels may be effectively clustered based on the similarly of the responses mediated by each, as described above. To this end, the method can include a standard Eigen analysis or a standard singular value decomposition (SVD) that can be used to cluster ODD kernels by computing the pairwise (Eigen analysis) or higher-order (SVD) correlations between the responses mediated by the individual ODD kernels. Each eigenvector associated with a large eigenvalue may correspond to one of the M ODD kernel clusters, where it is assumed there are M large eigenvalues and N-M small Eigen values at any given processing level in the hierarchy.

For a sufficiently large number of processing levels, here denoted by L, repeated down-sampling can optionally include feature detectors at processing levels greater than L to span the entire image. The method may further include residual correlations in the responses mediated by the $M_{(K-L)}$ ODD kernel clusters at these higher processing levels, and these correlations can be used to spatially group the $M_{(K-L)}$ ODD kernel clusters such that their 2D Euclidean distance (in pixel space) is proportional to their degree of correlation. Thus, the more correlated the responses mediated by a given pair of ODD kernel clusters, the closer these ODD kernels will be to each other in 2D pixel space, thus grouping ODD kernels in a 2D semantic space. For example, high level ODD kernels for hands, faces, arms, and legs may be grouped closer together than high level ODD kernels for walls, windows, and doorways, which, in turn, might be grouped closer to one another. As a result, the method can ensure that interactions between feature detectors at each processing level can remain relatively localized, thus permitting efficient parallel computation.

FIG. 5 is a flowchart 500 illustrating a method for identifying an object in an image or video, according to an embodiment of the present invention. More specifically, the method functions to capture, identify, detect, and/or extract a portion of an image or video from a larger image or video, the portion representing a desired object. As noted above, the method may be used in any number of machine vision or artificial intelligence applications including, but not limited to, surveillance, satellite imaging, traffic management, video-based database searching (e.g., web searching using video matching rather than text/hypertext matching), business intelligence, video content delivery, video content searching, data storage, data compression (e.g., storage only of the image portions relating to the desired object), data mining, gaming, user interface/experience, medical imaging/diagnostics, and/or any other suitable machine-human or machine-video interaction.

Some embodiments include generating a large training corpus, divided into target and distractor images, from which estimates of the pairwise (or n-wise) co-occurrence probability of oriented edges can be obtained at 510 conditioned on the presence or absence of globally salient contours. A kernel is then generated in response to each n-wise co-occurrence probability value at 520. From the determined kernel differences in these two probability distributions, corresponding to target and distractor edge features, ODD kernels are generated at 530. These ODD kernels are then convolved with every edge feature in the image to obtain the lateral contextual support at each location and orientation across the entire image at 540.

Edge features that receive substantial contextual support from the surrounding edges may be preserved at 550, indicating that these edge features are likely to belong to a globally salient contour. In other words, edge features having at least a predetermined level of contextual support are promoted. On the other hand, edge features receiving less than the predetermined level of contextual support are suppressed at 560, indicating that these suppressed features are more likely to be part of the background clutter. As noted above, the lateral contextual support may be applied in a multiplicative fashion, so as to prevent the appearance of illusory edges, and the process may be iterated several times, mimicking the exchange of information along horizontal connections in the primary visual cortex. A predetermined object is then identified in the image at 570 in response to the promoted edge features.

To obtain a large number of training images and to better isolate the role of cortical association fields linking low-level visual features, some embodiments employ abstract computer-generated shapes consisting of short, smooth contour segments that could either be globally aligned to form wiggly, nearly-closed objects (amoebas), or else randomly rotated to provide a background of locally indistinguishable contour fragments (clutter). Amoeba targets lack specific semantic content, presumably reducing the influence of high level cortical areas, such as the inferotemporal cortex (IT), where neurons are known to be selective for high-level categories such as faces, houses, etc. However, computer-generated images may not substantially eliminate the contribution to contour perception from extrastriate areas where more generic shape-specific features, such as angles, corners, etc., are extracted.

In some embodiments, the amoeba/no amoeba image set differs from stimuli used in previous psychophysical experiments that employed sequences of Gabor-like elements to represent salient contours against randomly oriented backgrounds. One advantage of contours represented by random Gabor fields is that the target and distractor Gabor elements can be distributed at approximately equal densities, precluding the use of local density operators as surrogates for global contour perception. However, the example amoeba/no amoeba image set is more akin to the natural image sets used in previous speed-of-sight object detection tasks, particularly with respect to studies employing line drawings derived from natural scenes. Humans can detect closed contours, whether defined by aligned Gabor elements or by continuous line fragments, in less than 200 ms. This is shorter than the mean interval between saccadic eye movements, thus mitigating the contribution from visual search. The amoeba/no amoeba image set may implement a pop-out detection task involving readily perceived target shapes, the complexity of which can be controlled parametrically.

Figure 6:
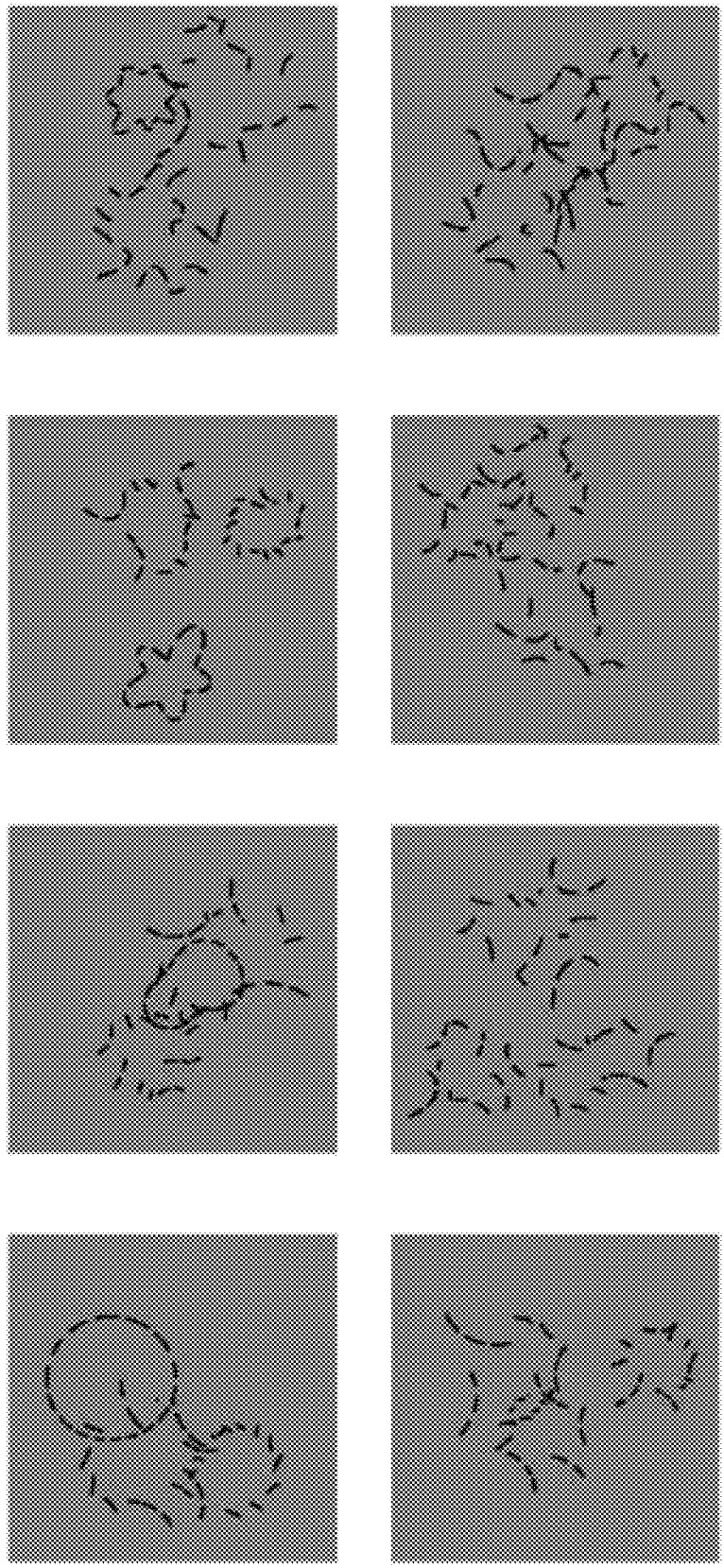
FIG. 6 illustrates a set of synthetic images, according to an embodiment of the present invention.

As noted above, some embodiments include designing an amoeba/no amoeba detection task using a novel set of synthetic images, as depicted in synthetic images 600 of FIG. 6. Amoebas are radial frequency patterns constructed via superposition of periodic functions described by a discrete set of radial frequencies around a circle. In addition, some embodiments include adding clutter objects, or distractors, that are locally indistinguishable from targets. Both targets and distractors may be composed of short contour fragments, thus eliminating unambiguous indicators of target presence or absence, such as total line length, the presence of line endpoints, and the existence of short gaps between opposed line segments.

To keep the bounding contours smooth, only the lowest K radial frequencies may be included in the linear superposition used to construct amoeba targets. To span the maximum range of contour shapes and sizes, the amplitude and phase of each radial frequency component may be chosen randomly, under the restriction that the minimum and maximum diameters could not exceed lower and upper limits. When only two radial frequencies are included in the superposition, the resulting amoebas were very smooth. As more radial frequencies are included, the contours became more complex. Thus, K, the number of radial frequencies included in the superposition, provides a control parameter for adjusting target complexity. FIG. 6 shows target and distractor images 600 generated using different values of K. The top row shows target images with increasing K numbers 2, 4, 6, and 8 respectively. The bottom row of FIG. 6 shows distractor images with only clutter fragments present.

Figure 7:
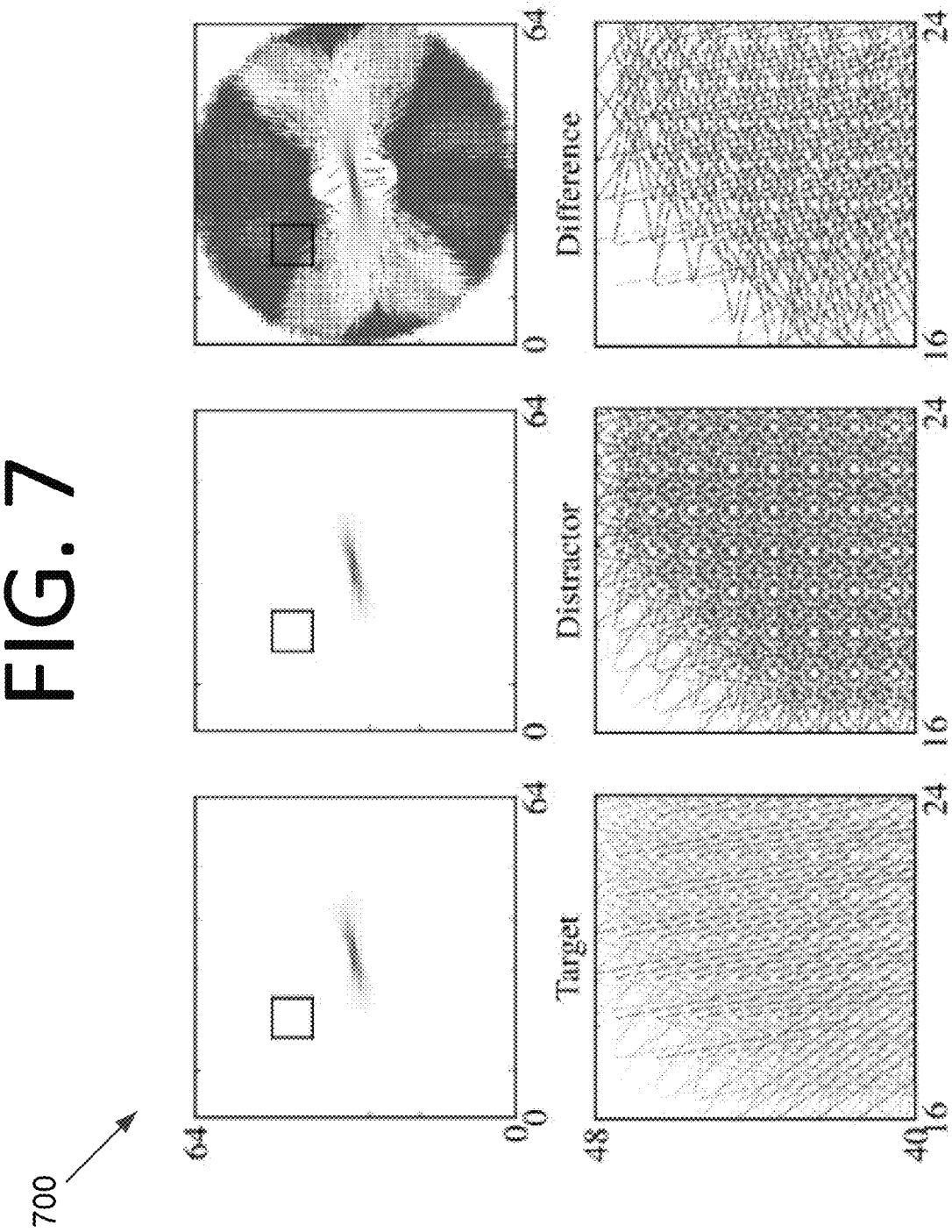
FIG. 7 illustrates target, distractor, and difference images from computing coactivation statistics for the responses of pairs of orientation-selective filter elements, according to an embodiment of the present invention.

In some embodiments, ODD kernels may be implemented for the amoeba/no amoeba task by computing coactivation statistics for the responses of pairs of orientation-selective filter elements, compiled separately for target, distractor, and difference images 700 as shown in FIG. 7. Because the amoeba/no amoeba image set is translationally invariant and isotropic, the central filter element may be shifted and rotated without loss of generality to a canonical position and orientation. Thus, the canonical ODD kernel may be defined relative to filter elements at the origin with orientation $\pi/16$ to mitigate aliasing effects. Filter elements located away from the origin can be accounted for by a trivial translation. To account for filter elements with different orientations, separate ODD kernels may optionally be computed for eight orientations, rotated to a common orientation, and then averaged to produce a canonical ODD kernel. The canonical kernel may then be rotated in steps between zero and $\pi$ (in $\pi/8$ increments) and then interpolated to Cartesian x-y axes by rounding to the nearest integer coordinates.

As shown in FIG. 7, for a single short line segment oriented approximately horizontally at the center (not shown), the co-occurrence-based support of other edges at different relative orientations and spatial locations is depicted. Axes were rotated by n/16 from vertical to mitigate aliasing effects. The color of each edge was set proportional to its co-occurrence-based support. Values may be negative, zero, or positive. In the left panel, co-occurrence statistics compiled from forty thousand target images are shown. In the center panel, co-occurrence statistics compiled from forty thousand distractor images are shown. In the right panel, an ODD kernel, given by the difference in co-occurrence statistics between target and distractor kernels, is shown. In the bottom row, subfields extracted from the middle of the upper left quadrant (as indicated by black boxes in the top row figures) are shown on an expanded scale to better visualize the difference in co-occurrence statistics between target and distractor images. Alignment of edges in target images is mostly cocircular, whereas alignment is mostly random in distractor images, accounting for the fine structure in the corresponding section of the ODD kernel.

Figure 8:
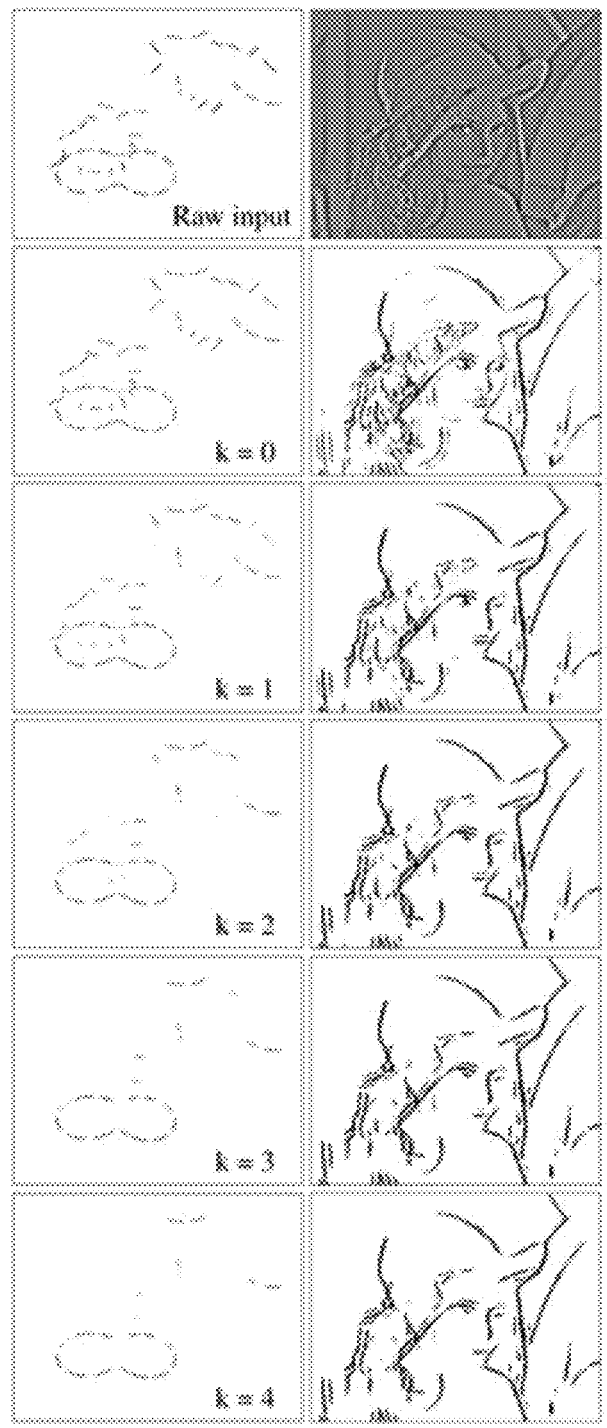
FIG. 8 illustrates the image "Lena" commonly used in machine vision tests, according to an embodiment of the present invention.

As shown in images 800 of FIG. 8, some embodiments can be used to process natural objects, in this example case the image "Lena" commonly used in machine vision tests. When applied in a similar manner to a natural gray-scale image to which a hard Difference-of-Gaussians (DoG) filter has been applied to maximally enhance local contrast (see FIG. 8, right column), preferred ODD kernels tended to preserve long, smooth lines while suppressing local spatial detail. Although ODD kernels were trained on a narrow set of synthetic images, the results exhibit some generalization to natural images due to the overlap between the cocircularity statistics of the synthetic image set and those of natural images.

Figure 9:
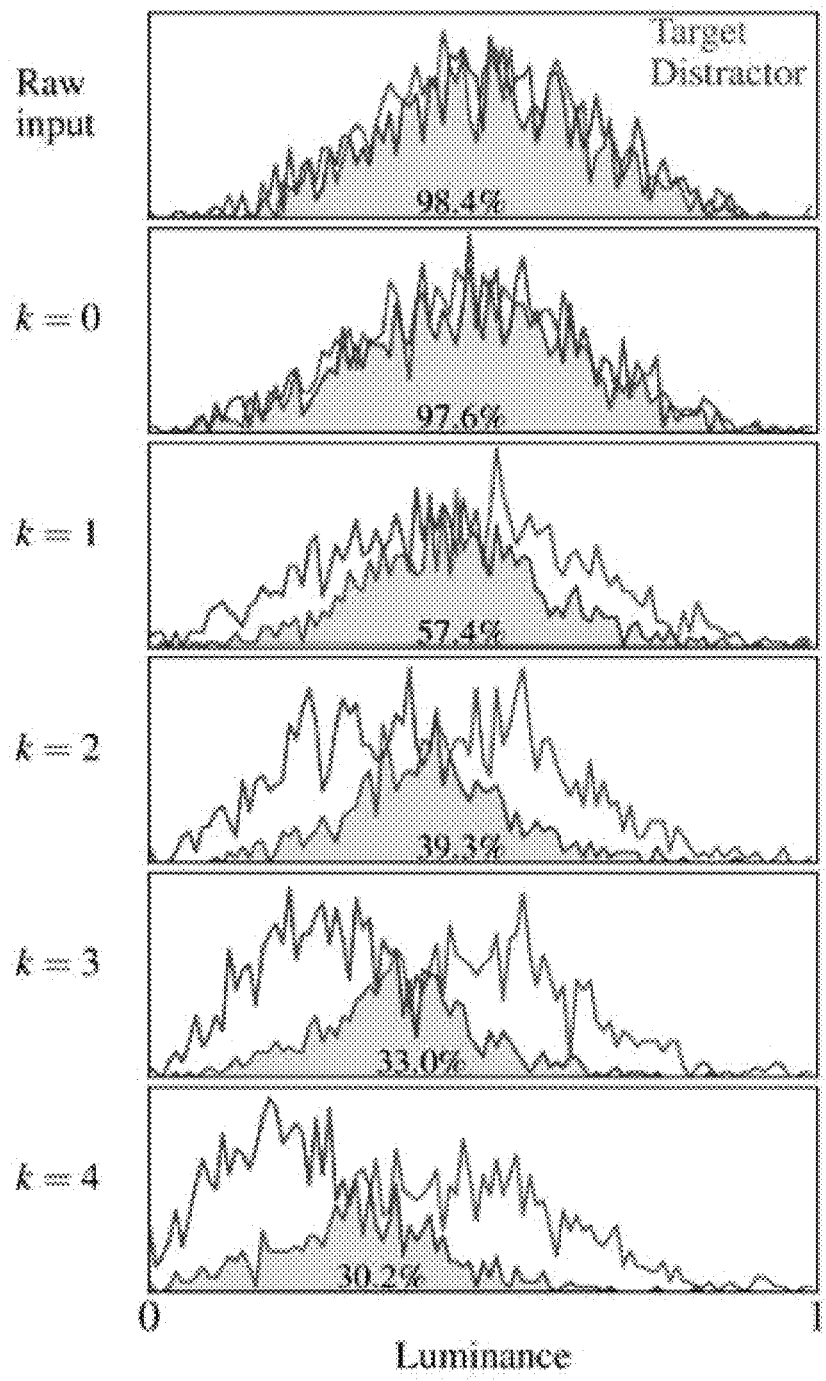
FIG. 9 illustrates histograms of the total activation that show increasing separability between target and distractor images as a function of the number of iterations, according to an embodiment of the present invention.

To quantify the ability of the model to discriminate between amoeba/no amoeba target and distractor images, some embodiments can use the total activation summed over all orientation-selective elements after k iterations of the ODD kernel. A set of two thousand target and distractor images may be used for testing. Test images were generated independently from the training images. Histograms of the total activation show increasing separability between target and distractor images as a function of the number of iterations (see histograms 900 of FIG. 9).

To maximize the range of shapes and sizes spanned by the synthetic targets and distractors, some embodiments do not require that the number of ON retinal pixels be constant across images. Rather, the retinal representations of both target and distractor images may encompass a broad range of total activity levels, although the two distributions can strongly overlap with no evident bias favoring one or the other. At the next processing stage, prior to any lateral interactions, there may be little or no bias evident in the bottom-up responses of the orientation-selective elements. Each iteration of the multiplicative ODD kernel may then cause the distributions of total activity for target and distractor images to become more separable, implying corresponding improvements in discrimination performance on the amoeba/no amoeba task.

In certain embodiments, the ODD kernels may be trained using forty thousand target and forty thousand distractor images, each divided into four sets of ten thousand images, with each set associated with a different value of K=2, 4, 6, 8. The order in which the images were presented may have no bearing on the final form of the ODD kernel. In other words, there may be no temporal component to the training. Any suitable number of training target/distractor images can be used.

In the example implementation, each 256×256 pixel training image may activate a regular array of 256×256 retinal elements whose outputs were either zero or one, depending on whether the corresponding image pixel was ON or OFF. Each retinal unit may further activate a local neighborhood of orientation-selective filters, which span eight angles spaced uniformly between zero and $\pi$. To mitigate aliasing effects, the orientation-selective filters may be rotated by a small, fixed offset equal to $\pi/16$ relative to the axis of the training images. Suitable orientation-selective filters may be 7×7 pixels and include a central excitatory subunit, represented by an elliptical Gaussian with a standard deviation of seven in the longest direction and an aspect ratio of seven, flanked by two inhibitory subunits whose shapes are substantially identical to the central excitatory subunit, but can be offset by +/−1.4 pixels in the direction orthogonal to the preferred axis.

The weight $W_\theta(x_1-x_2, y_1-y_2)$ from a retinal element at $(x_2, y_2)$ to a filter element at $(x_1, y_1)$ with dominant orientation $\theta$ can be given by a sum over excitatory and inhibitory subunits:

$$W_\theta(x_1 - x_2, y_1 - y_2) = W_\theta(r_1 - r_2) \quad (1)$$

$$= A\left\{\exp\left[\frac{1}{2}(r_1 - r_2) \cdot R_\theta^{-1} \sigma^{-1} R_\theta \cdot (r_1 - r_2)^T\right] - \right.$$

$$\exp\left[\frac{1}{2}(r_1 + f - r_2) \cdot R_\theta^{-1} \sigma^{-1} R_\theta \cdot (r_1 + f - r_2)^T\right] -$$

$$\left.\exp\left[\frac{1}{2}(r_1 - f - r_2) \cdot R_\theta^{-1} \sigma^{-1} R_\theta \cdot (r_1 - f - r_2)^T\right]\right\}$$

where the position vector is given by $r_i = [x_i, y_i]$ and the matrix $$\sigma = \begin{bmatrix} 1 & 0 \\ 0 & 7 \end{bmatrix}$$

describes the shape of the elliptical Gaussian subunits for $\theta = 0$. In Eq. 1, $R_\theta$ is a unitary rotation matrix, $$R_\theta = \begin{bmatrix} \cos\theta & \sin\theta \\ -\sin\theta & \cos\theta \end{bmatrix} \quad (2)$$

and $f = [0.0, 1.4]$ is a translation vector in the direction orthogonal to the dominant orientation when $\theta = 0$. The amplitude A is determined empirically so that the total integrated strength of all excitatory connections made by each retinal unit equals approximately twenty, and thus the total strength of all inhibitory connections made by each retinal unit equals approximately −40.0. Mirror boundary conditions may be used to mitigate edge effects. The retinal input to each orientation-selective filter element $s(x_1, y_1, \theta)$ is then given by $$s(x_1,y_1,\theta) = \Sigma_{x_2,y_2} W_\theta(x_1-x_2,y_1-y_2) I_{(x_1,y_1)}(x_2,y_2) \quad (3)$$

where $I_{(x_1,y_1)}$ is the 7×7 binary input image patch centered on $(x_1, y_1)$. The sum is over all pixels $(x_2, y_2)$ that are part of this image patch. The initial output of each orientation-selective filter element $z_0(x_1, y_1, \theta)$ can be obtained by comparing the sum of its excitatory and inhibitory retinal input to a fixed threshold of 0.5. Values below threshold were set to 0, whereas values above unity were set to 1.0. Thus, $$z(x_1,y_1,\theta) = g(s(x_1,y_1,\theta)) \quad (4)$$

where the function $$g(s) = \begin{cases} 0 & s < 0.5 \\ s & 0.5 \leq s \leq 1.0 \\ 1 & s > 1.0 \end{cases} \quad (5)$$

is an element-wise implementation of these thresholds. The responses of all suprathreshold orientation-selective filters contribute to the coactivation statistics, with only the relative distance, direction, and orientation of filter pairs being recorded. Because of the threshold condition, only the most active orientation-selective filters contribute to the coactivation statistics.

For every suprathreshold filter element that is extracted from the i-th target image, coactivation statistics can be accumulated relative to all surrounding suprathreshold filter elements extracted from the same image. Thus the ODD kernel G is given by $$G_{\theta-\theta_0}{}^{t_i}(\rho(x-x_0,y-y_0),\phi_{74\,0}(x-x_0,y-y_0)) = \Sigma_{x,y} z_0(x,y,\theta) \quad (6)$$

where the radial distance $\rho$ is a function of the $(x, y)$ coordinates of the two filter elements, the direction is the angle measured relative to $\theta_0$, the sum is over all suprathreshold elements within a cutoff radius of thirty two, the superscript $t_i$ denotes the i-th target image, and the difference in the orientations of the two filter elements $\theta - \theta_0$ is taken modulo $\pi$. Because the amoeba/no amoeba image set can be translationally invariant and isotropic, the central filter element may be shifted and rotated to a canonical position and orientation without loss of generality, such that the dependence on $(\rho_0, \phi_0, \theta_0)$ may be omitted. The coactivation statistics for the i-th target image can then be written simply as $G_\theta{}^{t_i}(\rho, \phi)$, where $(\rho, \phi)$ gives the distance and direction from the origin to the filter element with orientation $\theta$, given that the filter element at the origin has orientation $\pi/16$. An analogous expression gives the coactivation statistics for the j-th distractor image $G_\theta{}^{d_j}(\rho, \phi)$. The ODD kernel $G_\theta(\rho, \phi)$ is given by the difference $$G_\theta(\rho,\phi) = W_+ \Sigma_i G_\theta{}^{t_i}(\rho,\phi) - W_- \Sigma_j G_\theta{}^{d_j}(\rho,\phi) \quad (7)$$

where the sums are taken over all target and distractor images and the normalization factors $W_+$ and $W_-$ are determined empirically so as to yield a total ODD strength that may be three hundred twenty five, defined as the sum over all ODD kernel elements arising from either the target or distractor components. By construction, the sum over all ODD kernel elements equals zero, so that the average lateral support for randomly distributed edge fragments would be neutral. The example implementation discussed above does not depend critically on the root mean square (RMS) magnitude of the ODD kernel. To minimize storage requirements, individual connection strengths can be stored as unsigned 8-bit integers, such that the example implementation does not depend on computation of high precision kernels. However, subsequent studies demonstrated that target detection performance improved when the separate object and distractor kernels are stored at higher precision (e.g., 32 bits per element) in order to preserve information encoded by small differences between the two. The ODD kernel itself could likely be stored at low precision (e.g., 8 bits per element) once the difference between the object and distractor kernels has been evaluated.

As described above, the canonical ODD kernel is defined relative to filter elements at the origin with orientation n/16. Filter elements located away from the origin can be accounted for by a trivial translation. To account for filter elements with different orientations, separate ODD kernels can be computed for all eight orientations then rotated to a common orientation and averaged to produce a canonical ODD kernel. The canonical kernel can then be rotated in steps between zero and $\pi$ (starting with an offset of $\pi/16$) and then interpolated to Cartesian x-y axes by rounding to the nearest integer coordinates.

In the example implementation, ODD kernels can be used to compute lateral support for each orientation-selective filter element via linear convolution. The output of each filter element is then modulated in a multiplicative fashion by the computed lateral support. The procedure is preferably iterated by calculating new values for the lateral support s, which can again be used to modulate filter outputs in a multiplicative fashion:

$$s_k(x,y,\theta) = z_{k-1}(x,y,\theta) \Sigma_{x',y',\theta'} G_\theta(\rho(x-x',y-y')) \quad (8)$$

where the subscript k denotes the k-th iteration. The same kernel can optionally be used for all iterations. As noted above, the example implementation can be readily extended to any arbitrary number N of ODD kernels that function to distinguish N objects within an image. Furthermore, the example implementation can be performed iteratively and/or in parallel in order to optimize computing performance and/or resource allocation.

Figure 10:
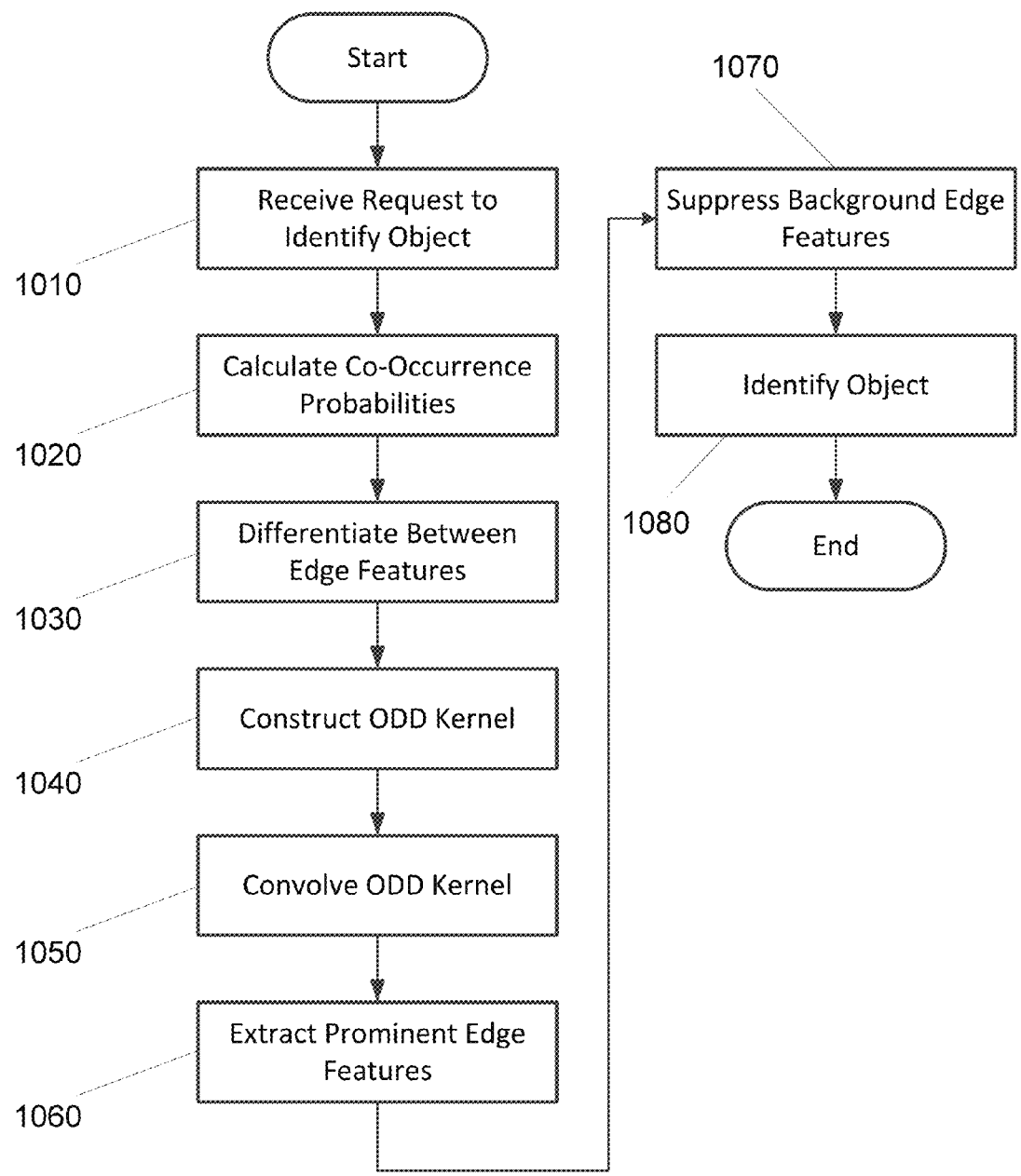
FIG. 10 is a flowchart illustrating a method for detecting edges in an image or video, according to an embodiment of the present invention.

FIG. 10 is a flowchart 1000 illustrating a method for detecting edges in an image or video, according to an embodiment of the present invention. In some embodiments, the method of FIG. 10 may be implemented, for example, by computing system 1200 of FIG. 12. The method begins with receiving a request to identify an object in the image or video at 1010. The request may include one or more of inputting, capturing, determining, calculating, and receiving input from a user. In some embodiments, the request may include classes, sets, subsets, or groupings of objects.

Next, a co-occurrence probability is calculated for two or more edge features in an image or video using an object definition at 1020. The calculating of the co-occurrence probability for the two or more edge features may include one or more of computing, determining, generating, and calculating an n-wise co-occurrence probability of oriented edges conditioned on a presence or absence of globally salient contours. The object definition may include one or more images or representations of the object spanning a desired range of poses and points of view. The object definition may be derived from a learned set of kernels that utilizes a training set or the object definition is derived from a training corpus including both target images and distractor images. When a training corpus is used, the training corpus is used, in part, to calculate the co-occurrence probability by determining and/or calculating a probability of two edge features being part of a single object/distractor.

Edge features are differentiated between in response to measured contextual support at 1030. The differentiation may include one or more of separating, categorizing, distinguishing, and differentiating two or more edge features into two or more categories. An object-distractor difference (ODD) kernel is constructed at 1040. The constructed ODD kernel is then convolved at 1050 with every edge feature, or a majority of edge features, in the image or video to obtain lateral contextual support at each location and/or orientation across the entire image or video. The ODD kernel may include a plurality of separate kernels having unique or quasi-unique orientations against which edge elements are measured.

Prominent edge features that have at least a predetermined level of contextual support are extracted at 1060 based on the measured contextual support, and edge features that do not have at least the predetermined level of contextual support are suppressed at 1070. In some embodiments, the extracting of the prominent edge features includes one or more of preserving, identifying, sequestering, promoting, and extracting edge features that have at least a predetermined level contextual support through an object-distractor difference (ODD) kernel while one or more of suppressing, eliminating, and demoting edge features that do not have at least the predetermined level of contextual support. In some embodiments, n-wise, hierarchical ODD kernels are used that detect and segment one object category from everything else. Finally, the object is identified at 1080 based on the extracted prominent edge features.

Figure 11:
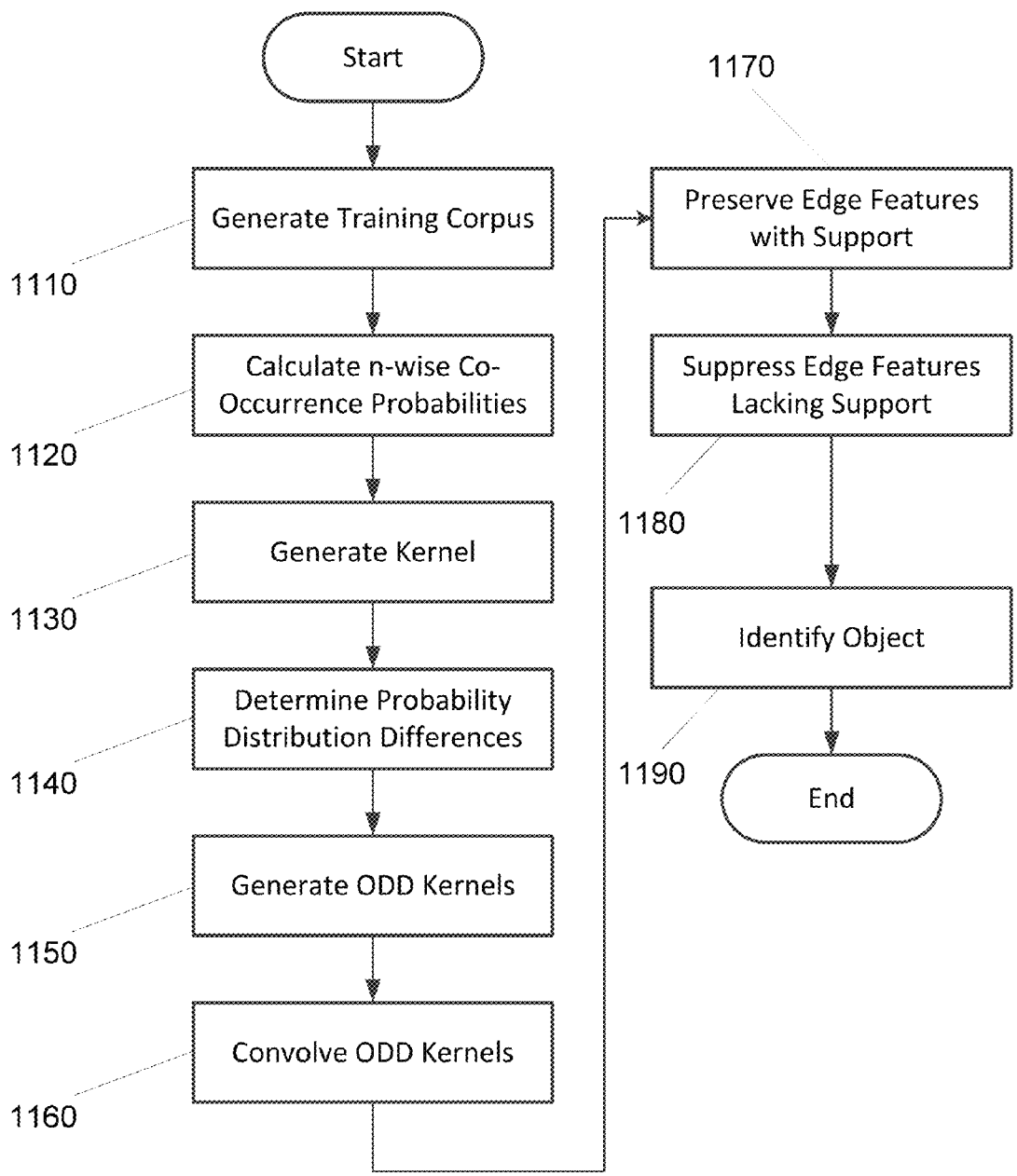
FIG. 11 is a flowchart illustrating a method for identifying an object in an image or video, according to an embodiment of the present invention.

FIG. 11 is a flowchart 1100 illustrating a method for identifying an object in an image or video, according to an embodiment of the present invention. In some embodiments, the method of FIG. 11 may be implemented, for example, by computing system 1200 of FIG. 12. The method begins with generating a training corpus that is divided into target and distractor images or videos at 1110. Estimates of n-wise co-occurrence probabilities of oriented edges are calculated conditioned on presence or absence of globally salient contours at 1120. A kernel is generated in response to each calculated n-wise co-occurrence probability value at 1130.

Differences between probability distributions are determined at 1140. Object-distractor difference (ODD) kernels are generated from the determined differences in the probability distributions at 1150. The ODD kernels are then convolved with each edge feature in an image or video at 1160 to obtain lateral contextual support at each location and orientation across the entire image or video.

Edge features with at least a predetermined level of contextual support from surrounding edges are preserved at 1170. Edge features with less than the predetermined level of contextual support from the surrounding edges are suppressed at 1180. An object is then identified in the image or video based on the preserved edge features at 1190.

Figure 12:
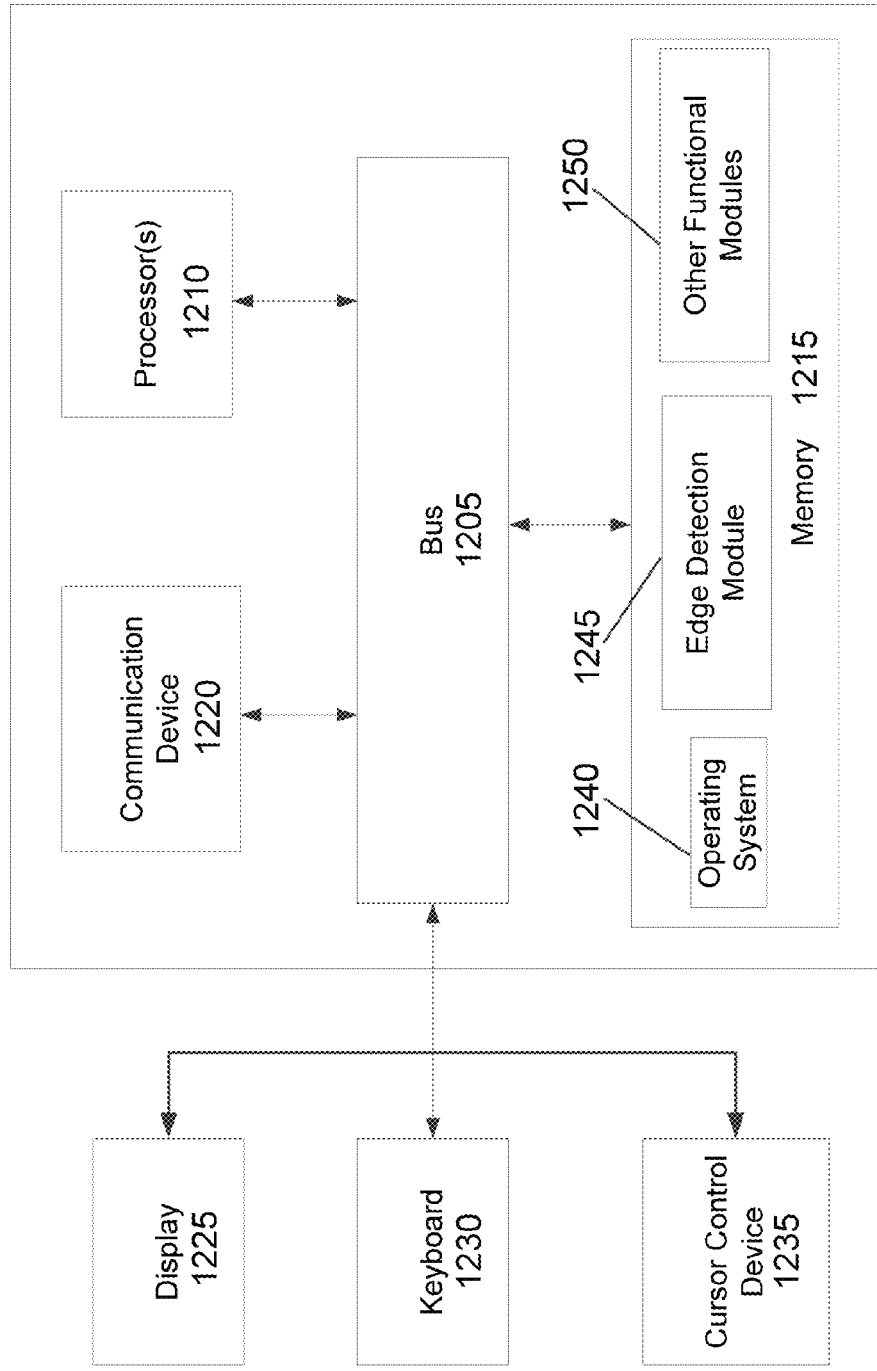
FIG. 12 is a block diagram of a computing system configured to detect edges pertaining to an object using contour and shape, according to an embodiment of the present invention.

FIG. 12 is a block diagram of a computing system 1200 configured to detect edges pertaining to an object using contour and shape, according to an embodiment of the present invention. Computing system 1200 includes a bus 1205 or other communication mechanism for communicating information, and processor(s) 1210 coupled to bus 1205 for processing information. Processor(s) 1210 may be any type of general or specific purpose processor, including a central processing unit ("CPU") or application specific integrated circuit ("ASIC"). Processor(s) 1210 may also have multiple processing cores, and at least some of the cores may be configured to perform specific functions. Computing system 1200 further includes a memory 1215 for storing information and instructions to be executed by processor(s) 1210. Memory 1215 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 1200 includes a communication device 1220, such as a transceiver, to wirelessly provide access to a communications network.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1210 are further coupled via bus 1205 to a display 1225, such as a Liquid Crystal Display ("LCD"), for displaying information to a user. A keyboard 1230 and a cursor control device 1235, such as a computer mouse, are further coupled to bus 1205 to enable a user to interface with computing system 1200. However, in certain embodiments such as those for mobile computing implementations, a physical keyboard and mouse may not be present, and the user may interact with the device solely through display 1225 and/or a touchpad (not shown). Any type and combination of input devices may be used as a matter of design choice.

In one embodiment, memory 1215 stores software modules that provide functionality when executed by processor(s) 1210. The modules include an operating system 1240 for computing system 1200. The modules further include an edge detection module 1245 that is configured to use relatively simple and efficient kernels to detect target edges in an object within an image or video. Computing system 1200 may include one or more additional functional modules 1250 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 3, 4, 9, and 10 may be performed by a computer program, encoding instructions for the nonlinear adaptive processor to perform at least the methods described in FIGS. 3, 4, 9, and 10, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 3, 4, 9, and 10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
calculating, by a computing system, a co-occurrence probability for two or more edge features in an image or video using an object definition;
differentiating between edge features, by the computing system, in response to a measured contextual support;
extracting, by the computing system, prominent edge features based on the measured contextual support; and
identifying the object, by the computing system, based on the extracted prominent edge features.

2. The computer-implemented method of claim 1, further comprising:
receiving, by the computing system, a request to identify an object in the image or video, wherein
the request comprises one or more of inputting, capturing, determining, calculating, and receiving input from a user.

3. The computer-implemented method of claim 2, wherein the request comprises classes, sets, subsets, or groupings of objects.

4. The computer-implemented method of claim 1, wherein the calculating of the co-occurrence probability for the two or more edge features further comprises one or more of computing, determining, generating, and calculating an n-wise co-occurrence probability of oriented edges conditioned on a presence or absence of globally salient contours.

5. The computer-implemented method of claim 1, wherein the object definition comprises one or more images or representations of the object spanning a desired range of poses and points of view.

6. The computer-implemented method of claim 1, wherein the object definition is derived from a learned set of kernels that utilizes a training set or the object definition is derived from a training corpus including both target images and distractor images.

7. The computer-implemented method of claim 6 wherein, when a training corpus is used, the training corpus is used, in part, to calculate the co-occurrence probability by determining and/or calculating a probability of two edge features being part of a single object/distractor.

8. The computer-implemented method of claim 1, wherein the differentiation comprises one or more of separating, categorizing, distinguishing, and differentiating two or more edge features into two or more categories.

9. The computer-implemented method of claim 1, further comprising:
constructing, by the computing system, an object-distractor difference (ODD) kernel; and
convolving the ODD kernel, by the computing system, with every edge feature, or a majority of edge features, in the image or video to obtain lateral contextual support at each location and/or orientation across the entire image or video.

10. The computer-implemented method of claim 9, wherein the ODD kernel comprises a plurality of separate kernels having unique or quasi-unique orientations against which edge elements are measured.

11. The computer-implemented method of claim 1, wherein the extracting of the prominent edge features comprises one or more of preserving, identifying, sequestering, promoting, and extracting edge features that have at least a predetermined level of contextual support through an object-distractor difference (ODD) kernel while one or more of suppressing, eliminating, and demoting edge features that do not have at least the predetermined level of contextual support.

12. The computer-implemented method of claim 1, wherein n-wise, hierarchical ODD kernels are used that detect and segment one object category from everything else.

13. A computer program embodied on a non-transitory computer-readable medium, the computer program configured to cause at least one processor to:
generate a training corpus that is divided into target and distractor images or videos;
calculate estimates of n-wise co-occurrence probabilities of oriented edges conditioned on presence or absence of globally salient contours; and
generate a kernel in response to each calculated n-wise co-occurrence probability value.

14. The computer program of claim 13, wherein the program is further configured to cause the at least one processor to:
determine differences between probability distributions determined when generating the kernels by computing a relative frequency with which a given edge feature occurs in associating with one or more surrounding edge features when the given edge feature either is, or is not, a component of a target object; and
generate object-distractor difference (ODD) kernels from the determined differences in the probability distributions.

15. The computer program of claim 14, wherein the program is further configured to cause the at least one processor to convolve the ODD kernels with each edge feature in an image or video to obtain lateral contextual support at each location and orientation across the entire image or video.

16. The computer program of claim 15, wherein the program is further configured to cause the at least one processor to preserve edge features with at least a predetermined level of contextual support from surrounding edges.

17. The computer program of claim 16, wherein the program is further configured to cause the at least one processor to suppress edge features with less than the predetermined level of contextual support from the surrounding edges.

18. The computer program of claim 17, wherein the program is further configured to cause the at least one processor to identify an object in the image or video based on the preserved edge features.

19. A system, comprising:
an image provider configured to distribute, provide, present, capture, record, process, and/or transmit one or more images and/or videos for object identification; and
an edge detection system configured to capture, identify, detect, and/or extract a portion of an image or video from a larger image or video provided by the image provider based on contour and shape, the edge detection system configured to generate object-distractor difference (ODD) kernels that utilize co-occurrence statistics of n-tuples of edge features and convolve the ODD kernels with every edge feature in the image or video to obtain lateral contextual support at each location and orientation across the image or video.

20. The system of claim 19, further comprising:
a user device configured to receive and transmit user input relating to an object identification and/or classification, receive, from the edge detection system, a determination of the object identification in an image or video, and present the object identification to the user.

* * * * *